United States Patent
Prochaska

Patent Number: 5,887,337
Date of Patent: Mar. 30, 1999

[54] COIL MOLDING APPARATUS AND METHOD

[75] Inventor: Stephen Prochaska, Lincoln, Nebr.

[73] Assignee: Centurion Intl., Inc., Lincoln, Nebr.

[21] Appl. No.: 807,660

[22] Filed: Feb. 27, 1997

[51] Int. Cl.⁶ .................................................. H01F 7/06
[52] U.S. Cl. .............................................................. 29/605
[58] Field of Search ........................... 29/605, 600, 601; 242/439; 264/250

[56] References Cited

U.S. PATENT DOCUMENTS

| | | | |
|---|---|---|---|
| 3,811,045 | 5/1974 | Turner et al. | 264/250 |
| 4,255,735 | 3/1981 | Liautaud | 336/192 |
| 4,725,395 | 2/1988 | Gasparaitis et al. | 264/250 |
| 5,263,639 | 11/1993 | Lee et al. | 228/176 |

*Primary Examiner*—David A. Scherbel
*Assistant Examiner*—Benjamin M. Halpern
*Attorney, Agent, or Firm*—Zarley, McKee, Thomte Voorhees & Sease; Dennis L. Thomte

[57] ABSTRACT

An apparatus and method for producing molded coils of the present invention includes a molding machine having threaded spindles for receiving the coils to be molded. The coils are threaded over the spindles so that during the molding process the pitch and diameter of the coils are accurately maintained. The process is automated by use of a controller and automated assembly machinery. The controller and automated assembly machinery integrate a coil winder, a molding machine, and an auto bagger to automate the entire process of producing the molded coils.

13 Claims, 4 Drawing Sheets

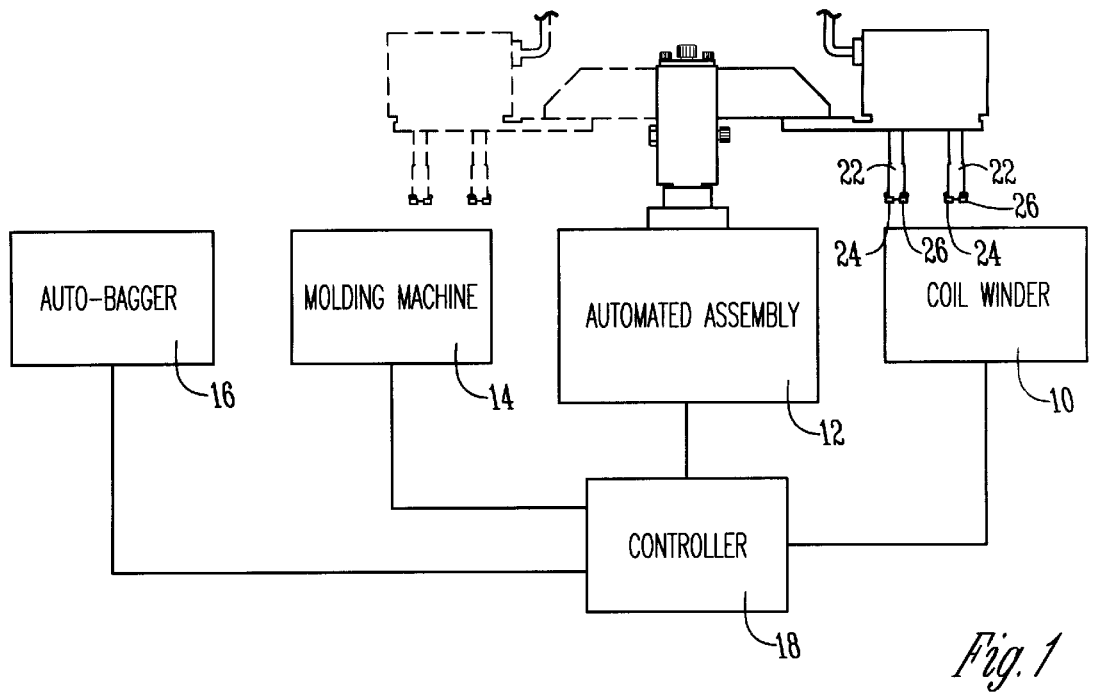
Fig. 1
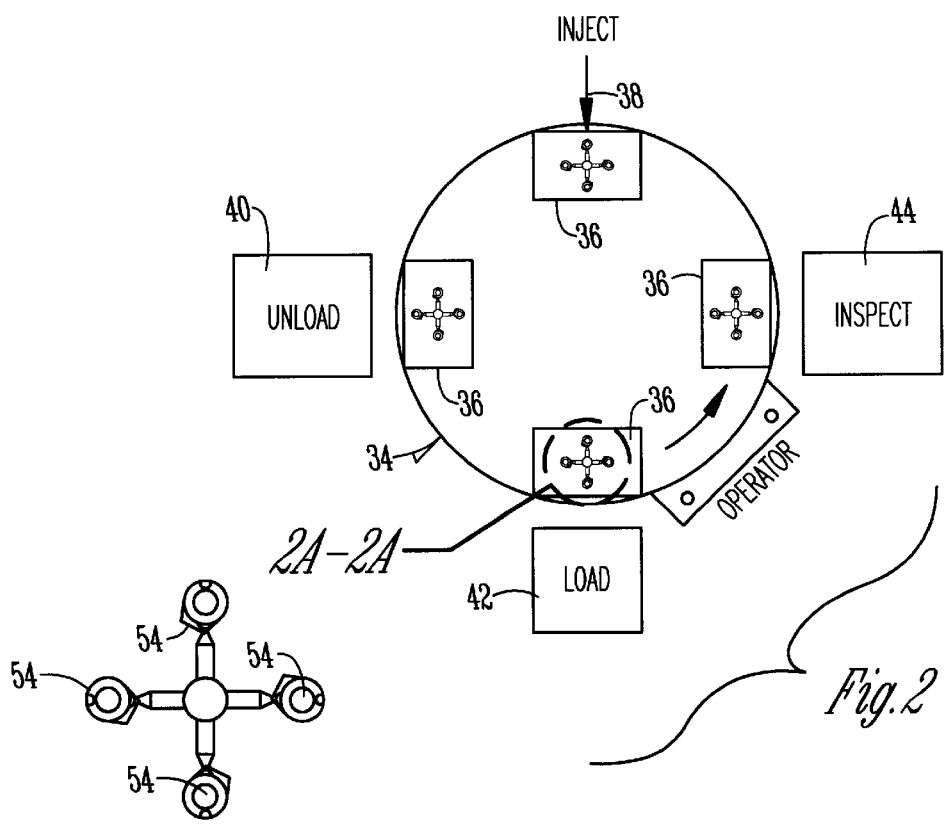
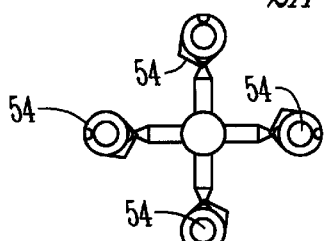
Fig. 2
Fig. 2A

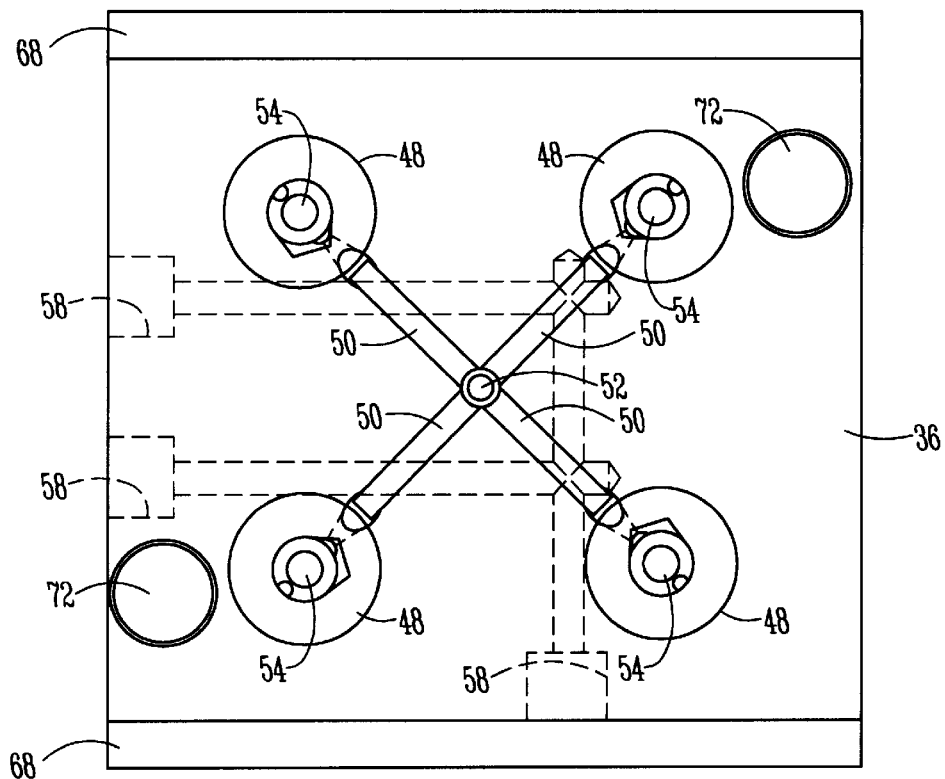
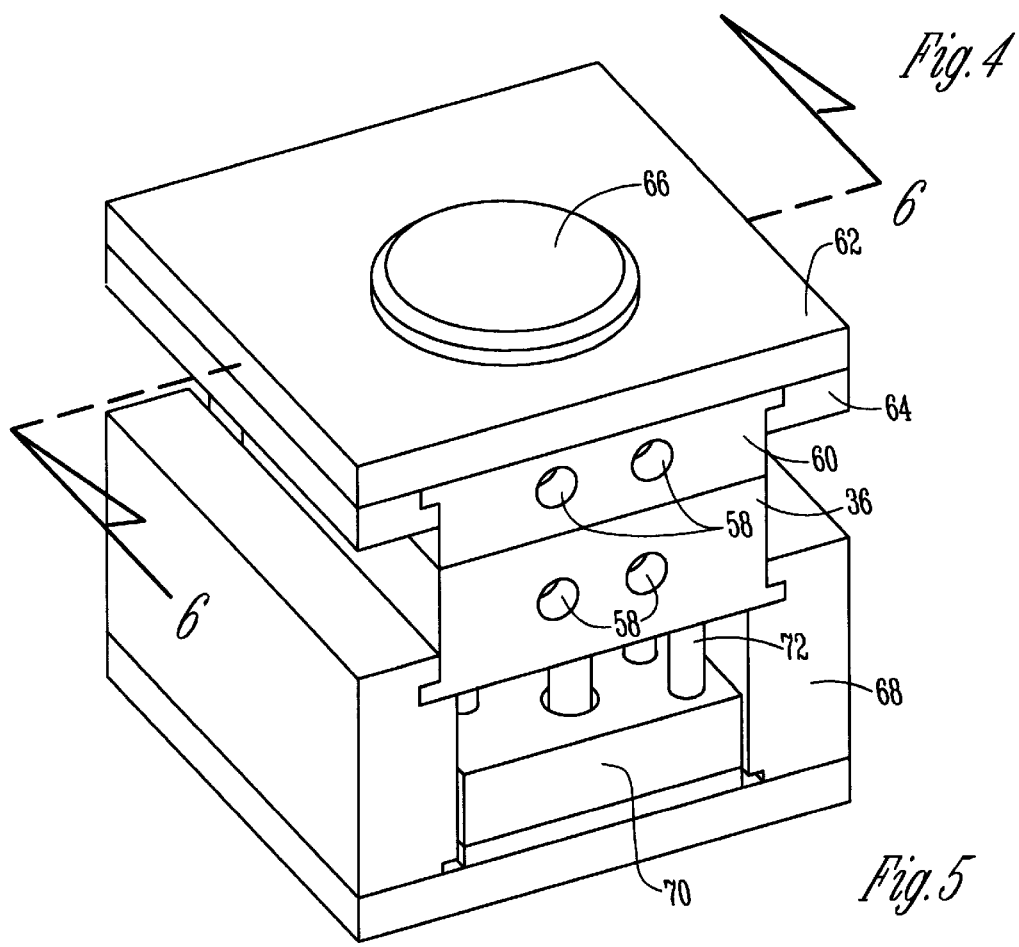

COIL MOLDING APPARATUS AND METHOD

BACKGROUND OF THE INVENTION

1. Field of the Invention

The present invention relates to processes for molding wire coils. More particularly, though not exclusively, the present invention relates to an apparatus and method for molding wire coils while accurately maintaining the pitch of the coils.

2. Problems in the Art

In some areas of the telecommunications field such as wireless communications, transceivers include an antenna which may telescope into a housing of the transceiver. A typical retractable antenna will include a small coil in the bottom of the housing which is used when the antenna is in the retracted position. These lower coils are critical to the performance of the transceiver. Small variations in the dimensions and pitch of the coil affect the performance of the transceiver. Naturally, any manufacturing process that does not maintain the required tolerances will result in lower coils which have an unsatisfactory and inconsistent performance. There is currently no prior art method of producing lower coils which accurately and consistently control the pitch of the coil.

A typical lower coil for a wireless telephone and the like is comprised of a wire coil encapsulated in a plastic molding. Prior art attempts at creating lower coils by an injection molding process are unsatisfactory since during the injection molding process, the pitches of the coil vary from the springs expanding and/or contracting resulting in coils tuned to various frequencies rather than to a consistent desired frequency. One example of a use of such a coil is with GSM devices. GSM is an international platform used with cellular phones around the world. The GSM frequency range is 800–900 MHz.

In addition, in any industry it is desired to automate labor intensive practices. In a typical lower coil molding process, an operator may frequently need to intervene with the process. The requirement of an operator for the molding machines naturally requires more labor cost.

It can therefore be seen that a process of using injection molding to create encapsulated lower coils is desired which keeps the pitch of the coils to a desired pitch.

Typical prior art lower coil molds have been used having one and two cavity molds with a parting line along the side with the wire coil laid down horizontally. When the plastic is injected around the coil, the coils move causing a variation in the pitch and therefore a variation in the tuned frequency. These prior art methods typically held the wire oil around a smooth surface where they make a few points of contact on the outside of the coil. The injection pressure from the plastic and the velocity of the plastic allows the plastic to get in between and move the pitch of the coil around which causes electrical performance problems.

Therefore, a need can be seen for an apparatus and process for efficiently and accurately manufacturing molded lower coils which maintains high tolerances for the coil with minimal requirements for manual intervention.

FEATURES OF THE INVENTION

The general feature of the present invention is the provision of an apparatus and method for molding wire coils which overcomes problems found in the prior art.

A further feature of the present invention is the provision of a method and apparatus for molding wire coils which uses an automated molding process and a threaded spindle for accurately maintaining the pitch of the molded coils.

Further features, objects and advantages of the present invention include:

An apparatus and method for molding wire coils which automates the process of winding, molding, and bagging wire coils.

An apparatus and method for molding wire coils which uses a submarine gate to separate the molded coil from the waste material.

An apparatus and method for molding wire coils which molds the coils in a vertical orientation.

These as well as other objects, features and advantages of the present invention will become apparent from the following specification and claims.

SUMMARY OF THE INVENTION

The apparatus and method for molding plastic coils of the present invention is used to create molded coils having a desired diameter and pitch. The invention is comprised of a threaded spindle disposed within a mold for spirally receiving the coil to be molded. By molding the plastic material around the coil while it is threaded on the spindle, the pitch and diameter of the coil can be accurately maintained.

The present invention may optionally include an apparatus and method for automatically degating the component from waste material by the use of a submarine gate. The process of the present invention may be automated by use of automated assembly machinery and a controller for controlling the process.

BRIEF DESCRIPTION OF THE DRAWINGS

FIG. 1 is a block diagram of the automated molding process of the present invention.

FIG. 2 is a top diagrammatic view of the molding process of the present invention. FIG. 2A is an enlarged top view of the area designated as 2A—2A in FIG. 2.

FIG. 4 is a top view of one of the lower halves of the molds used with the present invention.

FIG. 5 is a perspective view of one of the molds of the present invention.

DETAILED DESCRIPTION OF THE PREFERRED EMBODIMENT

Figure 8:
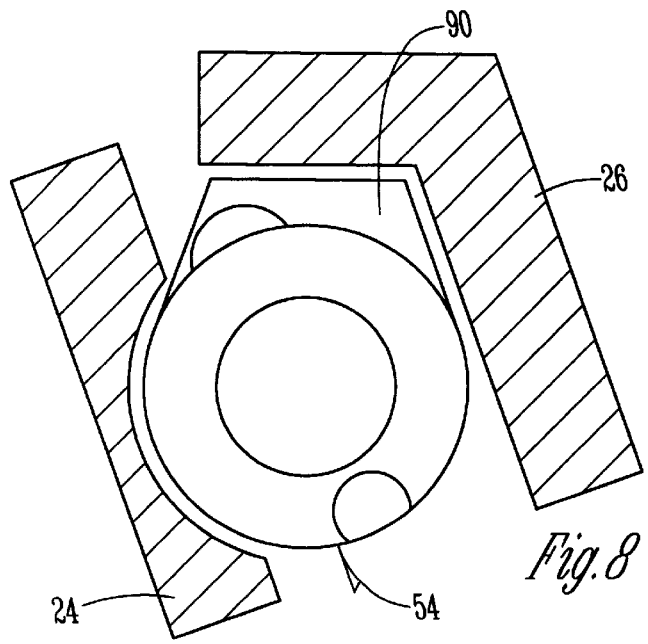
FIG. 8 is a sectional view showing the robotic jaws gripping the molded coil of the present invention.

The present invention will be described as it applies to its preferred embodiment. It is not intended that the present invention be limited to the described embodiment. It is intended that the invention cover all alternatives, modifications, and equivalencies which may be included within the spirit and scope of the invention.

FIG. 1 is a block diagram illustrating the automated coil winding process of the present invention. As shown, the present invention automates the molding process by integrating a coil winder 10, an automated assembly (robotics) system 12, a molding machine 14, an auto bagger 16 and a control system 18 resulting in one integrated assembly. after the coil is wound and cut by the coil winder 10, the auto assembly machinery 12 picks up the coils individually while rotating and orienting the coils and places them on the rotating molding machine 14. The molding machine 14 has a rotary table and four bases, each base having four cavities (described below). The molding machine 14 has an inspection station, an injecting station, a loading station, and unloading station (also described below). After the molding process is complete, the molding machine 14 rotates to an unload station where the auto assembly machinery 12 picks up the coils and drops them into the auto bagger 16 or a reject bin. The molding process of the present invention is controlled by a controller 18. The entire molding process is automated and does not require an operator to perform any manual steps. The block diagram in FIG. 1 shows the integration of the components shown but is not indicative of the relative sizes and orientations of the components.

The coil winder 10 shown in FIG. 1 is a five-axis computer aided CNC (numerical controlled) driven coil winder. The coil winder 10 is an off-the-shelf item built to the specifications required by the present invention. One example of a suitable coil winder is manufactured by Torin. The coil winder 10 includes a spool of coiled wire placed on a spool stand (not shown) and fed through the winding machine. The coil wire goes through a straightening process before it is wound into a coil. The coil winder 10 is computer controlled with pneumatic actuators that tell the winder when to turn or when to rotate, how long the wire is, where to cut the wire off, etc. The coil winder 10 makes one coil at a time. The coil winder 10 is programmed to wind the coil to a certain pitch and with a certain length. By changing the programming, the same wire can be used to make coils with various pitches, diameters, and lengths.

Figure 3:
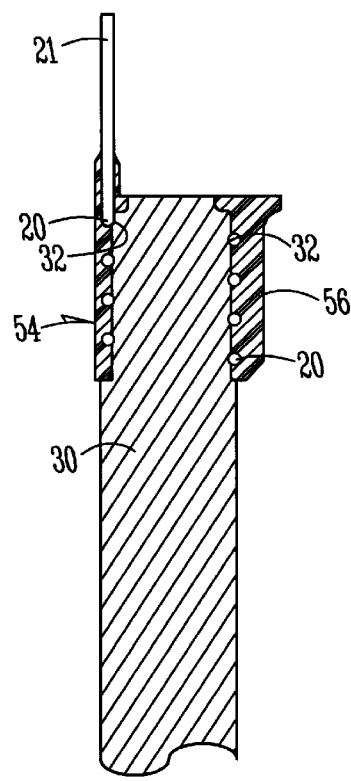
FIG. 3 is a sectional view of the threaded spindle and molded coil of the present invention.

The first step in the automated molding process is to load the wound coils onto threaded mandrels which are a part of the mold base 36 on the molding machine 14. As described above, the coil winder 10 creates wire coils 20 which are then picked up by the auto assembly system 12. The auto assembly system 12 is comprised of pick and place equipment and is integrated with the molding machine 14. The auto assembly system 12 includes four robotic driver arms 22 which each have opposing jaws 24 and 26 formed at the lower ends to grasp the coils 20 (FIG. 1). The auto assembly machine 12 will pick up a coil 20 from the coil winder 10 and, by means of a sensor and locating hole, will thread each coil 20 over a threaded mandrel 30 of the molding machine 14 (FIG. 3). The coils 20 are threaded onto the mandrel 30 by use of pressure sensitive servos. Pressure sensors are located on the jaws 24 and 26 which indicate when the end of the coil 20 has come around the pitch on the mandrel 30 and when the coil 20 bottoms out into the last of the grooves 32. When the coil 20 has been threaded onto the mandrel far enough the pressure sensors will indicate the resulting tightness of the oil 20 and will cause the jaws 24 and 26 to release the coil 20.

Note that FIG. 3 shows the coil 20 after the molding process. Once the four coils 20 are loaded onto the molding machine 14, the molding machine will rotate 90° and the robotic driver arms 22 will have four new coils 20 ready to be placed over another set of threaded mandrels 30.

FIG. 2 shows a top view of the molding machine 14. The molding machine 14 includes a rotary table 34 having four lower half mold bases 36 and one mating upper mold half (described below). The rotary table 34 rotates in 90° increments to pass the mold bases 36 to four stations including an injection station 38, an unloading station 40, a loading station 42, and an inspection station 44. In this way, four different steps of the molding process are simultaneously performed. While one set of four coils 20 are loaded by the auto assembly machine 12 at the loading station 42, another set of coils 20 are inspected at the inspection station 44, a third set of coils 20 are injected with molding material at the injection station 38, a fourth set of coils 20 are unloaded from the molding machine 14 at the unloading station 40.

FIG. 4 is a top view of one of the four lower half mold bases 36 shown in FIG. 2 showing the main components of the mold base 36. The mold base 36 is preferably about 6 inches by 6 inches. The mold base 36 includes four cavity inserts 48 where the coils 20 are molded as well as a runner system 50 in which the molding material flows before being injected around the coils 20 within the cavity inserts 48. FIG. 4 also shows a sucker pin 52 positioned where the molding material is introduced into the runner system 50. FIG. 4 also shows four molded components 54 which are each comprised of a coil 20 and a thermoplastic resin 56 (the molding material) molded around the coil 20. See FIGS. 2A to 2D.

Each mold of the molding machine 14 is cooled by water flowing through cooling channels 58. The cooling channels 58 are used to control the temperature of the mold base 36 whether it needs to be heated or cooled. The purpose of controlling the temperature of the mold base 36 is to keep the base at a constant temperature to facilitate heat transfer from the hot plastic that is injected and to dissipate the heat out of the mold base 36 so that the molds and components 54 can cool off faster and at a steady rate. Without the cooling channels 58, the mold would have isolated hot spots at each cavity insert 48.

FIG. 5 is a perspective view of one of the four molds on the rotary table 34. A mold includes a lower "B half" and a mating upper "A half". The molding machine 14 includes four lower B halves and one upper A half. The A half is comprised of an upper cavity block 60, a top clamp plate 62, an A housing 64, and a sprue 66 which is where the plastic enters the mold. The B half is comprised of the lower cavity block or, a B housing 68, an ejector plate 70, and return pins 72. The upper cavity block 60 and the mold base 36 are inserts that can slide in and out of the housings 64 and 68 and replaced with other inserts if other designs are desired. It is important to see that the molding machine 14 includes four B halves but only one A half. The B halves are mounted on the rotary table 34 and rotate along with the rotary table 34. The upper A half remains at the injection station 38. The B half is immovable relative to the rotary table 34. The A half moves up or down relative to the B half so that during the injection of molding material, the A and B halves are pressed together (FIG. 5). After the injection step, the A half raises away from the B half.

Figure 7:
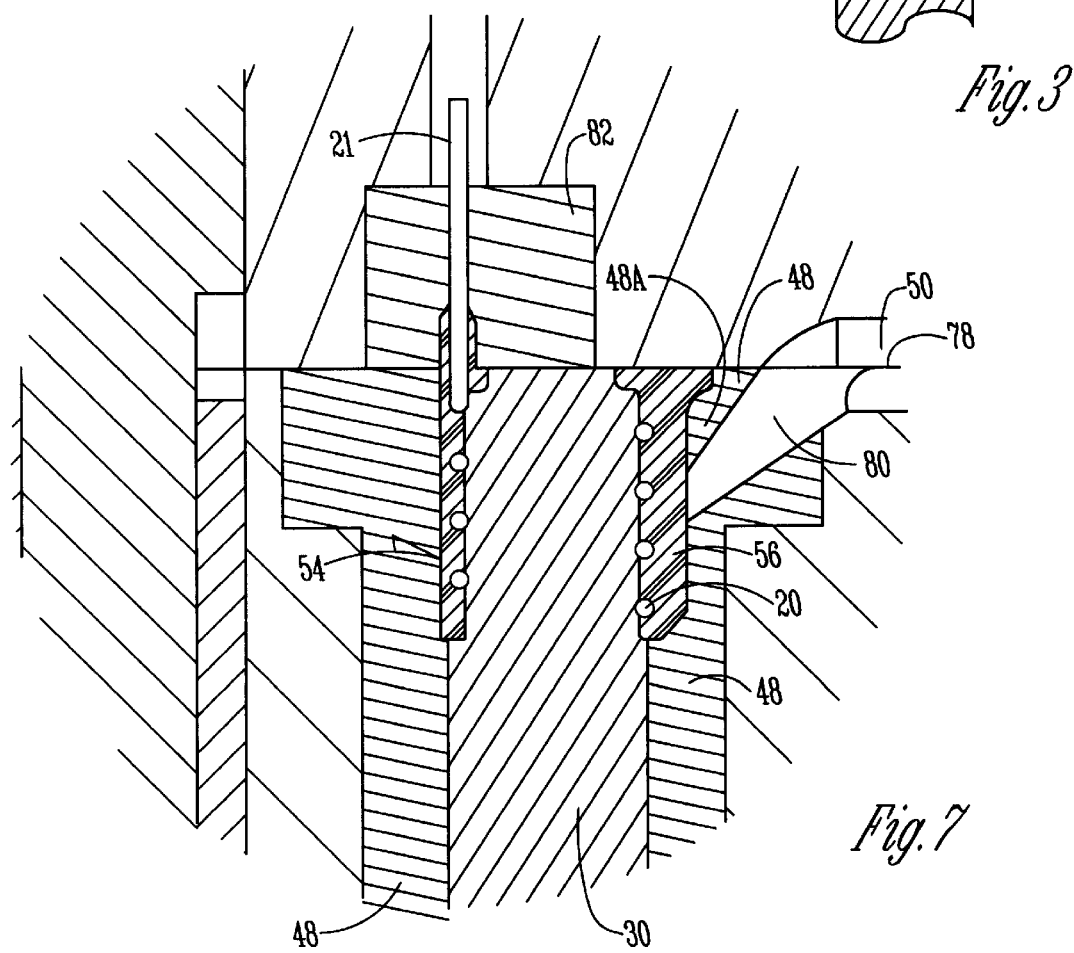
FIG. 7 is an enlarged sectional view taken along line 7—7 of FIG. 6.
Figure 6:
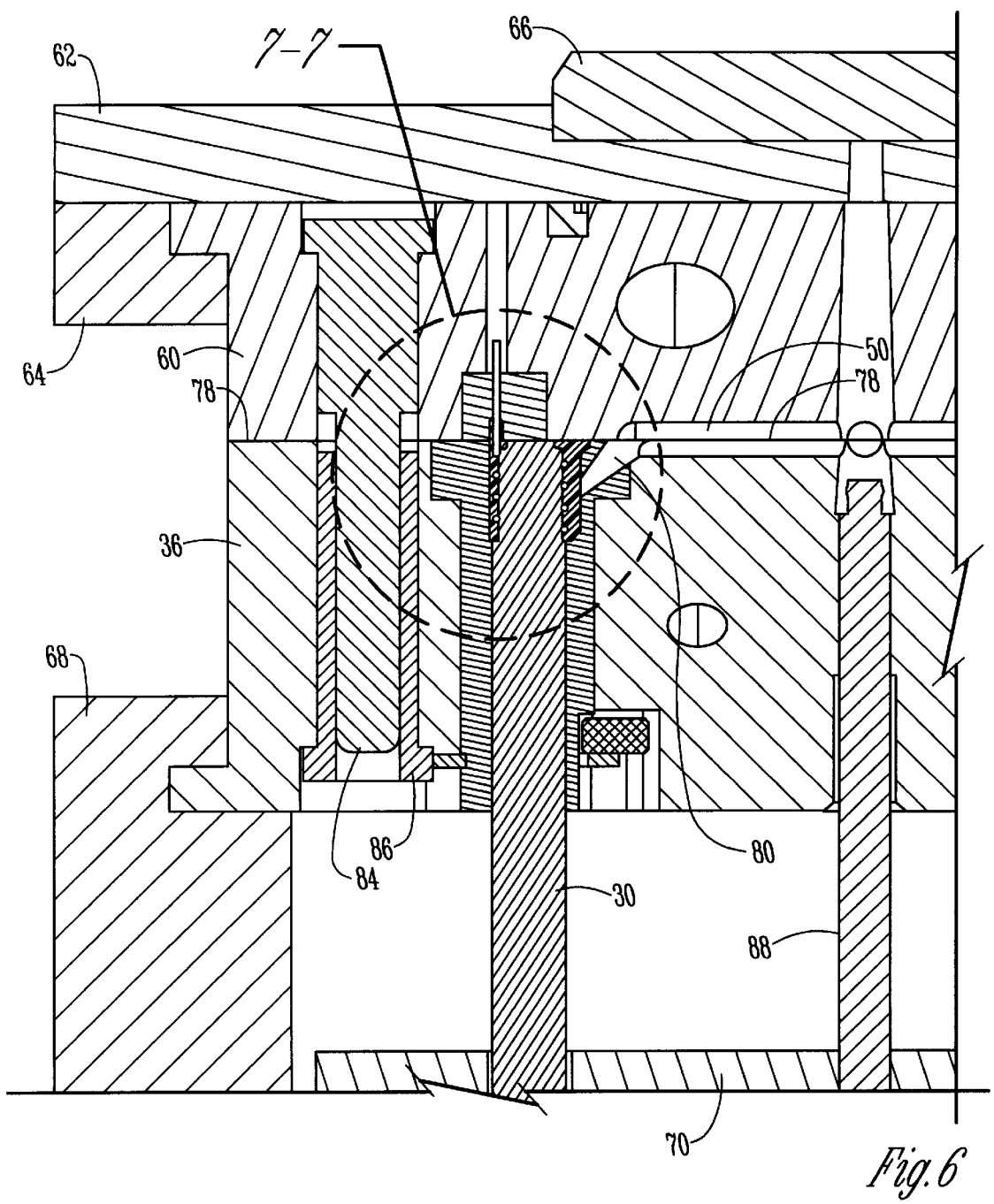
FIG. 6 is a sectional view taken along line 6—6 of FIG. 5.

FIG. 6 is an enlarged sectional view of the A and B halves of the mold shown in FIG. 5. FIG. 6 shows in detail one of the four cavity inserts 48 of the mold base 36 and its corresponding threaded mandrel 30. As shown, the runner 50 is formed in the mold base 36 and the upper cavity block 60. Formed at the end of the runner 50 is a submarine gate 80. A parting line 78 is formed where the upper cavity block 60 meets the mold base 36, i.e., where the A and B halves meet. The gate 80 transfers the molten molding plastic from the runner 50 down below the parting line 78 as shown. FIG. 7 is an enlarged view of the mandrel 30, coil 20, the plastic resin 56, the submarine gate 80, as well as the surrounding parts. For clarity, FIGS. 6 and 7 only show the molding plastic 56 molded onto the coil 20. During the injection step, the plastic will also be disposed within the runners 50 and the gates 80. The plastic disposed in the gate 80 travels around the threaded mandrel 30 and the coil 20 within the cavity insert 48. As discussed above, the mandrel 30 has threads or grooves 32 formed in it which match the desired pitch of the coil 20 exactly (FIG. 3). The threaded mandrel 30 is housed within the cavity insert 48 and is connected to an ejector plate 70. The mandrel 30 therefore will not rotate but will only travel vertically with the ejector plate 70. Also shown in FIG. 7 is a carbide bushing 82 into which the stem 21 of the coil 20 is inserted into when the mold is closed. The bushing 82 seals off the mold around the stem 21. Also shown in FIG. 6 is a leader pin 84 and leader pin bushing 86 which are standard mold components. A leader pin 84 and bushing 86 help to orient the A and B halves of the mold. The leader pin 84 and the bushing 86 are machined within 0.001 inches of each other so that when the mold closes, the A and B halves of the mold are within that tolerance. A sprue puller pin 88 is also attached to the ejector plate 70. When the ejector plate 70 is pushed upward, the sprue puller pin 88 and the mandrels 30 push up on the component 54 and the plastic disposed in the runners 50 which degates the part (described below) and exposes the component 54 so that the robotics of the auto assembly machinery 12 can grip the components 54.

The molded component 54 is degated (separated from the waste molding material) in the following manner. As described above, the molding plastic flows through the runner 50, through the gate 80, and forms the resin 56 around the coil 20. After the A half has been raised and the table 34 rotated 90° to the unload station 40, the ejector plate 70 is moved upward relative to the mold base 36. When the ejector plate 70 moves upward, the mandrel 30 and puller pin 88 also raise upward. This causes the component 54 and the waste plastic formed in the runners 50 and gate 80 to also raises upward. However, the cavity insert 48 remains with the mold base 36 so that the plastic within the runner 50 and gate 80 is sheared off from the component 54 by the edge 48A of the cavity insert 48 (FIG. 7). In this way, the component 54 is self degating since the metal from the cavity insert 48 shears the plastic off without a secondary step of cutting or removing the waste plastic. The degating takes place in about 0.3 seconds. Other types of gate designs could also be used, such as tunnel gates, jump gates, half-moon gates, etc.

At the unload station 40, the robotic driver arms 22 will grip the components 54 and unthread them from the mandrels 30. FIG. 8 is a sectional top view of the end of one of the four driver arms 22 showing the movable jaw 24 and the fixed jaw 26. To grasp the component, the driver arms 22 will come down next to the component 54 with the fixed jaw 26 being aligned with a flange 90. The movable, or free floating jaw 24 will clamp the component 54 between the jaws 24 and 26. The clamping force of the jaws 24 and 26 is controlled by a servo control. Alternatively, the clamping force could be provided by belt drives or gear drives, etc. The shape of the movable jaw 24 may be curved or flat. The jaws 24 and 26 could take on many different shapes without effecting their function. When the robotic driver arms 22 and jaws 24 and 26 have clamped on to the components 54, the servo drive will unwind the components 54 from the threaded mandrels 30 and will be electronically timed with the pitch of the coil 20 such that the rotation and the vertical movement of the driver arms 22 will unwind and raise the components 54 at the same time. In other words, the components 54 are each rotated and moved vertically at the same time to correspond with the pitch of the coil.

Once the components 54 have been unwound and removed from the mandrels 30, they are sent to the auto bagger 16 which bags and seals the components (50–100 components per bag). In an alternative embodiment, unmolded coils 20 from the coil winder 10 can be sent directly to the auto bagger 16 before they go to the molding machine 14. The auto assembly device 12 also transfers and releases the waste plastic formed in the runners 50 into a scrap bin. The controller 18 remembers what was inspected at the inspection station 44 (FIG. 2). If something wrong was detected at the inspection station 44, the molded components 54 would be unloaded into a reject bin rather than to the auto bagger 16.

The controller 18 is preferably built into the molding machine 14 and includes a graphical user interface (GUI) for use by the operator. The GUI is either a touch screen, keyboard, or other type of input device which is operator friendly. The operator defines the result that they want to achieve and the controller 18 instructs the operator what button to push to achieve that result. The controller 18 includes a list of possible machine stoppages or problems which can be displayed to the operator in the form of an alarm screen. For example, if something in the inspection station 44 or the coil winder 10 goes bad, the operator will go to the controller 18 and it will indicate that to the operator.

The present invention operates as follows. When describing the operation of the present invention, one set of four coils 20 will be followed through the process from beginning to end. Note that during the molding process, other steps are performed simultaneously on other sets of coils 20. The coils 20 begin as a roll of wire. The coil winder 10 creates the wire coils 20 from the roll of wire. After the coils 20 are formed, the automated assembly machinery 12 uses a set of robotic drivers 22 having opposing jaws 24 and 26 to thread the coils 20 over threaded mandrels 30 which are a part of the mold base 36. This is performed at the loading station 42 shown in FIG. 2. Once the set of four coils 20 are threaded over the threaded mandrels 30, the rotary table 34 of the molding machine 14 rotates 90° counter clockwise to the inspection station 44. Here the coils 20 are inspected to insure that they are properly threaded over the grooves 32 of the threaded mandrel 30. If the upper mold half comes down over coils 20 that have been placed improperly onto the mandrels 30, it will crush the vertical stem 21 of the coil. To inspect the coils 20, a set of sensors and electronic eyes come down over the top of the coils and sense the location of each of the vertical stems 21. If any one of the vertical stems 21 is not in its correct position, the molding step is skipped. The controller 18, which controls the process, will remember the results of the inspection as either pass or fail. The rotary table 34 then rotates 90° counter clockwise again moving the coils 20 to the injection station 38. At the injection station 38, the A half of the mold comes down over the B half of the mold (FIG. 5). As the B half meets the A half, a parting line 78 is formed between the A and B halves. Also, a carbide bushing 82 comes down along with the A half around the stem 21 of the coil 20. The molding material, such as a plastic resin, is then introduced via the sprue 66 where it travels through the runners 50 (FIGS. 4 and 6) and flows into the submarine gates 80 and around the coils 20 within the cavity inserts 48. During the molding process, water flows through the water channels 58 to help control the temperature of the mold which determines the amount of time before the plastic resin solidifies. The A half of the mold then raises away from the B half and the rotary table 34 rotates 90° counter clockwise to the unload station 40. At the unload station 40, the ejector plate 70 raises causing the mandrels 30 and the pin 88 to raise upward. When the mandrel 30 is raised, the cavity insert 48 remains stationary so that the edge 48A of the cavity insert 48 will sheer the plastic off isolating the resulting component 54 from the waste plastic formed within the runners 50 and gates 80. The component 54 is therefore automatically degated. The auto assembly machinery 12 will then grasp the components 54 via the driver arms 22 and jaws 24 and 26 and simultaneously rotate and raise the component 54 until it is separated from the threaded mandrel 30. The robotics will then rotate over to a bin and will open the jaws 24 and 26 and the components 54 will drop into a tray which feeds into the automatic bagger 16 where they are bagged and sealed. If the coils 20 did not pass the inspection at the inspection station 44, the resulting unmolded coils 20 will be placed in a reject bin. The waste material formed in the runners 50 and gates 80 are then loaded into a scrap bin. The rotary table 34 then rotates 90° counter clockwise to the loading station 42 and the threaded mandrels 30 are again loaded with coils 20 and the process repeats.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A method of molding a coating on a coil for use with high frequency equipment comprising the steps of:

providing a wire coil;

providing a threaded spindle having threads with a pitch chosen to correspond with a desired pitch for the wire coil;

threading the wire coil onto the threaded spindle;

providing a molding cavity around at least part of the wire coil and spindle;

injecting molding material into the molding cavity to coat the wire coil to create a molded coil; and turning the molded coil to unthread the molded coil from the threaded spindle.

2. The method of claim 1 wherein the threaded spindle is vertically oriented.

3. The method of claim 1 wherein the molding material injected into the molding cavity is comprised of thermoplastic resin.

4. The method of claim 1 wherein the step of providing a wire coil further comprises the steps of:

providing a coil winding machine;

providing a source of wire; and creating wire coils by winding wire from the source of wire.

5. The method of claim 4 further comprising the step of automatically bagging a plurality of the wire coils.

6. The method of claim 5 further comprising the steps of:

providing a robotic assembly system;

using the robotic assembly system to thread the wire coil onto the threaded spindle; and using the robotic assembly system to remove the wire coil from the molding cavity after the injecting step.

7. The method of claim 1 further comprising the step of inspecting the wire coil after it is threaded onto the threaded spindle to insure that it is threaded properly.

8. The method of claim 7 wherein the wire coil is inspected using electronic sensors.

9. The method of claim 7 further comprising the steps of:

providing an automated bagging device; and loading the molded coil into the automated bagging device after it is unthreaded from the threaded spindle.

10. The method of claim 9 further comprising the step of bypassing the automated bagger if the wire coil was not properly threaded onto the threaded spindle.

11. The method of claim 1 further comprising the step of degating the molded coil from any undesired molding material before the unthreading step.

12. A method of molding a coating on a coil for use with high frequency equipment comprising the steps of:

providing a wire coil;

providing a threaded spindle having threads with a pitch chosen to correspond with a desired pitch for the wire coil;

threading the wire coil onto the threaded spindle;

providing a molding cavity around at least part of the wire coil and spindle;

injecting molding material into the molding cavity to coat the wire coil to create a molded coil; turning the molded coil to unthread the molded coil from the threaded spindle; and degating the molded coil from any undesired molding material before the unthreading step, the degating being accomplished using a submarine gate.

13. The method of claim 12 wherein the molded coil is degated by raising the threaded spindle relative to the molding cavity such that a portion of the molding cavity shears off the undesired molding material from the molded coil.

* * * * *